May 21, 1963   R. C. GARRETT   3,090,064
HANDLE FOR SCOURING PADS
Filed Sept. 19, 1961

INVENTOR.
ROBERT C. GARRETT

BY Kimmel & Crowell
ATTORNEYS.

United States Patent Office 3,090,064
Patented May 21, 1963

3,090,064
HANDLE FOR SCOURING PADS
Robert C. Garrett, 1125 W. 8th St., McGregor, Tex.
Filed Sept. 19, 1961, Ser. No. 139,165
4 Claims. (Cl. 15—209)

This invention relates to a handle for scouring pads and has as its primary object the provision of a handle to which a scouring pad may be secured to facilitate the use thereof when cleaning kitchen utensils such as pots, pans or the like, or any other surface to which this method of cleaning is applicable.

An additional object of the invention is the provision of a device of this character comprised of a handle portion having a base portion with a recess therein, and means forming teeth interiorly of said recess which will serve to grasp and engage a scouring pad.

An additional object of the invention is the provision of additional teeth on the rim of the base thereof which will prevent the pad from backing off or disengaging the prongs when the device is in use.

A further object of the invention is the provision of a handle of this character which is sturdy and durable in construction, reliable and efficient in operation, and relatively simple and inexpensive to manufacture, and which will further securely hold the pad positioned thereon during prolonged use.

Still other objects reside in the combinations of elements, arrangements of parts, and features of construction, all as will be more fully pointed out hereinafter and disclosed in the accompanying drawing wherein there is shown a preferred embodiment of this inventive concept.

In the drawings.

Similar reference characters refer to similar parts throughout the several views of the drawings.

Figure 1:
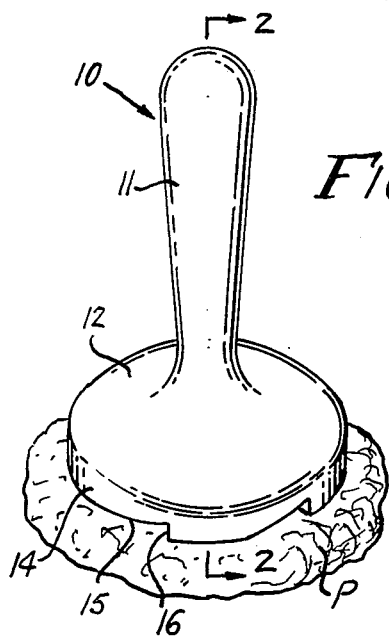
FIGURE 1 is a perspective view of the device of the instant invention shown in association with a scouring pad, the latter being indicated in dotted lines.
Figure 2:
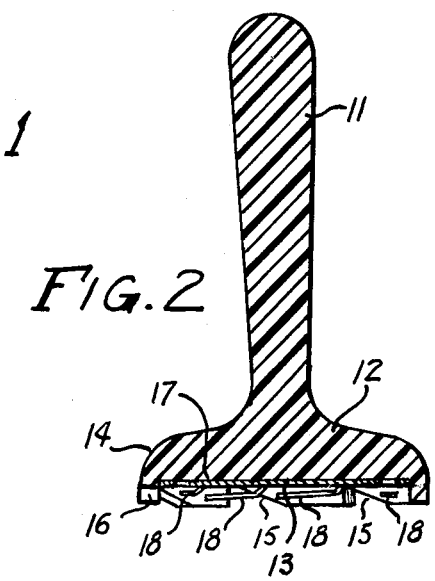
FIGURE 2 is a sectional view taken substantially along the line 2—2 of FIG. 1 as viewed in the direction indicated by the arrows.
Figure 3:
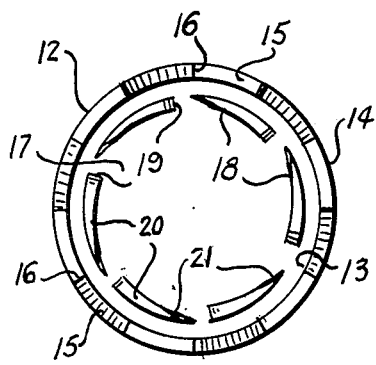
FIGURE 3 is a bottom plan view of the structure of FIG. 1.
Figure 4:
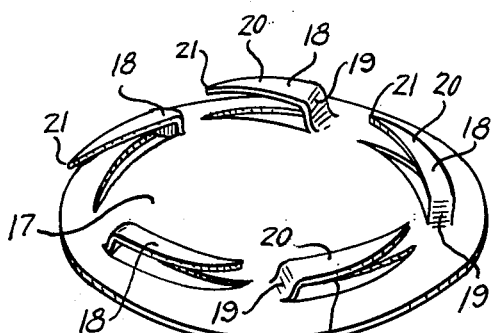
FIGURE 4 is a perspective view of a plate forming a component part of one form of the instant invention shown as disassociated from the handle.

Having reference now to the drawings in detail, the device of the instant invention is generally indicated at 10 and comprises an elongated upright handle 11, of a size and configuration to be readily grasped in the hand of a user. Integrally associated with the handle 11 is a circular base 12 lying in a plane perpendicular to the elongation of the handle. Obviously, any other form of handle may be used, if desired.

The underside of base 12 is cut away to form a circular recess 13 surrounded by an annular rim 14. The rim 14 is provided with serrations comprised of angularly cutaway portions 15 terminating in right angular portions 16 forming teeth in the outer rim, the purpose of which will be more fully described hereinafter. A circular metallic plate 17 is provided with prongs 18, which are stamped or cut therefrom, and which comprise upstanding portions 19 and bent portions 20 which lie in a plane offset from but parallel to the plane of the disc or plate 17. The teeth 18 terminate in points 21, which are adapted to engage with the fibers of the scouring pad. Plate 17 may be force fitted into recess 13, or held therein in any desired manner as, for example, by adhesive, or tacks (not shown), or the like.

The arrangement is thus such that when it is desired to secure a scouring pad P which is formed, as is customary, from steel wool, brass wool, plastic, or the like, the pad is held in the palm of the hand and the handle 11 is turned to insert the points 21 and the teeth 18 into the fiber of the pad securely holding the pad adjacent the plate 17.

The teeth 15, 16 in the rim or annulus 14 preclude the backing off of the pad or the disengagement thereof when the pad is in use. To remove the old pad, the outside of the pad is worked in a downward direction to disengage it from the teeth 15, 16 and the motion of the handle is reversed to disengage the pad from the prongs 18.

Figure 5:
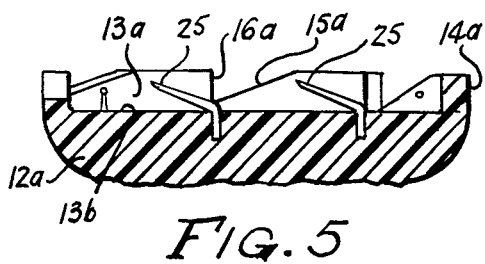
FIGURE 5 is an enlarged sectional view showing a modified form of the instant invention.

In the modified form of the invention disclosed in FIG. 5, the base 12a is formed with a recess 13a surrounded by an annular rim 14a provided with serrations comprised of cutaway portion 15a and right angular portions 16a, all substantially identical to the previously described structure. However, in this form of the invention the plate 17 is omitted completely and teeth 25 are provided directly on the bottom 13b of recess 13a. Such teeth may be molded or formed directly from the material of the base or may be formed of wire and driven into the material of the base or otherwise secured thereto in any desired manner.

From the foregoing it will now be seen that there is herein provided an improved handle for holding scouring pads which accomplishes all the objects of this invention, and others, including many advantages of great practical utility and commercial importance.

As many embodiments may be made of this inventive concept, and as many modifications may be made in the embodiments hereinbefore shown and described, it is to be understood that all matter herein is to be interpreted merely as illustrative, and not in a limiting sense.

I claim:

1. A handle for scouring pads comprising, in combination, a handle member, a disc-like base integral with said handle lying in a plane perpendicular to said handle, said base having a circular recess therein on the side opposite said handle, pointed pad grasping prongs in said recess, said prongs having portions extending in one direction about the periphery of the recess adapted to engage in the material of a scouring pad when the pad is rotated within the recess in a direction toward the points of said prongs to engage said prongs and hold said pad in said recess and serrations on said base, each of said serrations having a tooth surface and a cut away portion, each of said tooth surfaces being disposed at substantially right angles to the plane of said base and facing the point of one of said prongs, said cut away portions being angularly disposed with respect to said tooth surfaces, and said serrations being engageable with a pad grasped by said prongs to prevent displacement of the same therefrom.

2. A handle for scouring pads comprising, in combination, a handle member, a disc-like base integral with said handle lying in a plane perpendicular to said handle, said base having an annular rim defining a circular recess therein on the side opposite said handle, and pointed pad grasping prongs in said recess, said prongs in said recess comprised of wire with end portions bent in the same direction to lie in angular offset relation to said recessed disc-like base, and serrations on said base, each of said serrations having a tooth surface and a cut away portion, each of said tooth surfaces being disposed at substantially right angles to the plane of said base and facing the point of one of said prongs, said cut away portions being angularly disposed with respect to said tooth surfaces, and said serrations being engageable with a pad grasped by said prongs to prevent displacement of the same therefrom.

3. A handle for scouring pads comprising, in combination, a handle member, a disc-like base integral with said handle lying in a plane perpendicular to said handle, said base having a circular recess therein on the side opposite said handle, and pointed pad grasping prongs positioned about the peripheral edge of the flat base of said recess with end portions bent to lie in substantially parallel offset relation to said recessed disc-like base and extending in the same direction whereby a scouring pad in said recess will, when rotated in one direction, be engaged and secured in said recess by said prongs, said recess forming an annular rim on said disc-like base, and serrations formed in said rim, each of said serrations having a tooth surface and a cut away portion, each of said tooth surfaces being disposed at substantially a right angle to the plane of said base and facing the point of one of said prongs, said cut away portions being angularly disposed with respect to said tooth surfaces and said serrations being engageable with a pad grasped by said prongs to prevent the disengagement of said pad from said prongs when said handle is in use.

4. A handle for scouring pads comprising, in combination, a handle member, a disc-like base integral with said handle lying in a plane perpendicular to said handle, said base having a circular recess therein on the side opposite said handle, a plate secured in said recess, and pad grasping prongs positioned peripherally about said plate, said prongs comprising upstruck portions of said plate having thereon end portions bent to lie in parallel offset relation to said plate and extending in the same direction whereby a scouring pad in said recess rotated in a direction opposite to the direction of said prongs will be engaged and secured in said recess by said prongs, said recess forming an annular rim on said disc-like base, and serrations formed in said rim forming teeth, each of said serrations having a tooth surface and a cut away portion, each of said tooth surfaces being disposed at substantially a right angle to the plane of said base and facing said end portion of one of said prongs, said cut away portions being angularly disposed with respect to said tooth surfaces, and said serrations being engageable with a pad grasped by said prongs to prevent the disengagement of said pad from said prongs when said handle is in use.

References Cited in the file of this patent

UNITED STATES PATENTS

| | | |
|---|---|---|
| 1,118,989 | Wolf | Dec. 1, 1914 |
| 1,703,260 | Boehler | Feb. 26, 1929 |
| 1,984,990 | Reineman | Dec. 18, 1934 |

FOREIGN PATENTS

| | | |
|---|---|---|
| 110,767 | Australia | June 5, 1940 |